United States Patent [19]
Lo

[11] Patent Number: 5,819,311
[45] Date of Patent: Oct. 13, 1998

[54] EYE SHADING DEVICE

[76] Inventor: Jackson Lo, 18 Whitman Street, Willowdale, Ont, Canada, M2M 3H8

[21] Appl. No.: 863,362

[22] Filed: May 27, 1997

[51] Int. Cl.[6] .................................. A61F 9/00; B60J 3/00
[52] U.S. Cl. ............................................ 2/12; 2/10; 2/453
[58] Field of Search ................................ 2/10, 12, 13, 15, 2/451, 453; 296/97.8, 97.1, 97.4, 97.7, 97.9, 97.12, 97.13; 403/329, 326, 330; 351/158

[56] References Cited

U.S. PATENT DOCUMENTS

| | | | |
|---|---|---|---|
| 4,304,005 | 12/1981 | Danley, Sr. | 2/10 |
| 4,848,822 | 7/1989 | Da Costa | 296/97.8 |
| 4,885,808 | 12/1989 | Carpenter | 2/452 |
| 5,056,164 | 10/1991 | Lisle et al. | 2/453 |
| 5,129,102 | 7/1992 | Solo | 2/10 |
| 5,267,768 | 12/1993 | Tsai | 296/97.8 |

*Primary Examiner*—Jeanette E. Chapman
*Assistant Examiner*—Tejash D. Patel
*Attorney, Agent, or Firm*—Ladas & Parry

[57] ABSTRACT

An eye shading device includes a mounting block, a pivot frame and a lens member. The mounting block has opposite sides which are formed respectively with a pivot hole, vertical and horizontal retaining grooves that extend from an insert end of the pivot hole, and a protuberance that is defined by the vertical and horizontal retaining grooves. The mounting block further has a top side provided with a planar fastening member. The pivot frame is generally U-shaped and includes a pair of resilient arm portions and an intermediate retaining portion that interconnects the arm portions. The arm portions have bent distal sections that extend pivotally and respectively into the pivot holes in the opposite sides of the mounting block. The lens member is secured to the retaining portion of the pivot frame and is pivotable downwardly relative to the mounting block from an initial position, where the arm portions of the pivot frame are received respectively in the horizontal retaining grooves such that the lens member is held in a substantially horizontal position, to a position of use, where the arm portions of the pivot frame move resiliently past the protuberances so as to be received respectively in the vertical retaining grooves and hold the lens member in a generally vertical position.

5 Claims, 6 Drawing Sheets

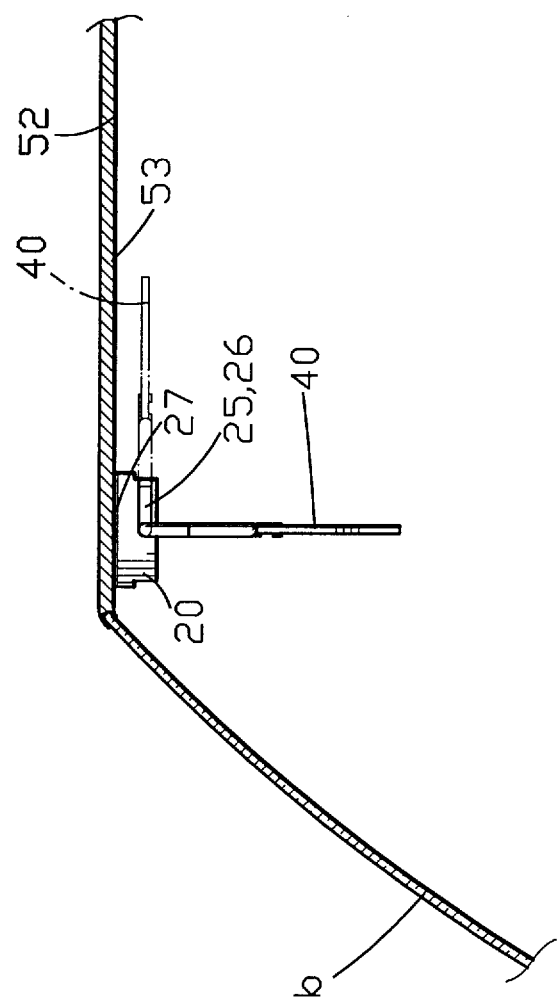

EYE SHADING DEVICE

BACKGROUND OF THE INVENTION

1. Field of the Invention

The invention relates to an eye shading device, more particularly to an eye shading device which is easy to install and which has a lens member than can be held stably in a position of use.

2. Description of the Related Art

Eye shading devices are personal items which can provide protection to the eyes of the user against the glare of sunlight. One example of a conventional eye shading device is a lens member that is adapted to be clipped on an eyeglass frame to enable a pair of eyeglasses to function as a pair of sunglasses. Referring to FIG. 1, another example of a conventional eye shading device 10 is adapted to be secured on the visor 12 of a cap. The eye shading device 10 generally comprises a rectangular mounting block 14, a lens member 17 and a pivot frame 16 for mounting pivotally the lens member 17 on the mounting block 14. The mounting block 14 has opposite sides 15 which are formed respectively with a blind pivot hole. The pivot frame 16 is a generally U-shaped frame with a pair of arm portions that extend pivotally and respectively into the pivot holes of the mounting block 14, and an intermediate retaining portion that interconnects the arm portions and that has the lens member 17 secured thereon. The mounting block 14 has a top side formed with a pair of screw holes 18. A pair of screws 19 extend through mounting holes 13 in the visor 12 and engage the screw holes 18 in the mounting block 14, thereby securing the eye shading device 10 on a bottom side of the visor 12.

Referring to FIG. 2, in use, the lens member 17 can be pivoted downwardly relative to the mounting block 15 from an initial position, where the lens member 17 is disposed substantially parallel to the visor 12 above the line of sight of the wearer of the cap, as indicated by the phantom lines, to a position of use, where the lens member 17 extends downwardly from the visor 12 and is directly in front of the eyes of the wearer of the cap to provide protection against the glare of sunlight.

It is noted that the use of screws 19 require the forming of mounting holes 13 in the visor 12 and screw holes 18 in the mounting block 14, thereby resulting in a relatively inconvenient and time-consuming assembly process. In addition, once the mounting holes 13 have been formed, the cap with the visor 12 cannot be used without the eye shading device 10 due to the presence of the mounting holes 13 in the visor 12.

Another drawback of the conventional eye shading device 10 resides in that the lens member 17 can be easily pivoted relative to the mounting block 14 by a gust of wind, thereby requiring frequent adjustment of the lens member 17. The conventional eye shading device 10 is thus inconvenient to use.

SUMMARY OF THE INVENTION

Therefore, the object of the present invention is to provide an eye shading device which is easy to install and which has a lens member than can be held stably in a position of use.

Accordingly, the eye shading device of this invention comprises a mounting block, a pivot frame and a lens member. The mounting block has opposite sides which are formed respectively with a pivot hole that has an insert end, vertical and horizontal retaining grooves that extend from the insert end of the pivot hole, and a protuberance that is defined by the vertical and horizontal retaining grooves. The mounting block further has a top side provided with a planar fastening member. The pivot frame is generally U-shaped and includes a pair of resilient arm portions and an intermediate retaining portion that interconnects the arm portions. The arm portions have bent distal sections that extend pivotally and respectively into the pivot holes in the opposite sides of the mounting block. The lens member is secured to the retaining portion of the pivot frame and is pivotable downwardly relative to the mounting block from an initial position, where the arm portions of the pivot frame are received respectively in the horizontal retaining grooves such that the lens member is held in a substantially horizontal position, to a position of use, where the arm portions of the pivot frame move resiliently past the protuberances so as to be received respectively in the vertical retaining grooves and hold the lens member in a generally vertical position.

BRIEF DESCRIPTION OF THE DRAWINGS

Other features and advantages of the present invention will become apparent in the following detailed description of the preferred embodiments with reference to the accompanying drawings, of which:

FIG. 6 is a schematic view which illustrates the second preferred embodiment of an eye shading device of this invention, the second preferred embodiment being secured on a bottom side of a roof of a vehicle in front of a driver seat of the latter.

DETAILED DESCRIPTION OF THE PREFERRED EMBODIMENTS

Figure 1:
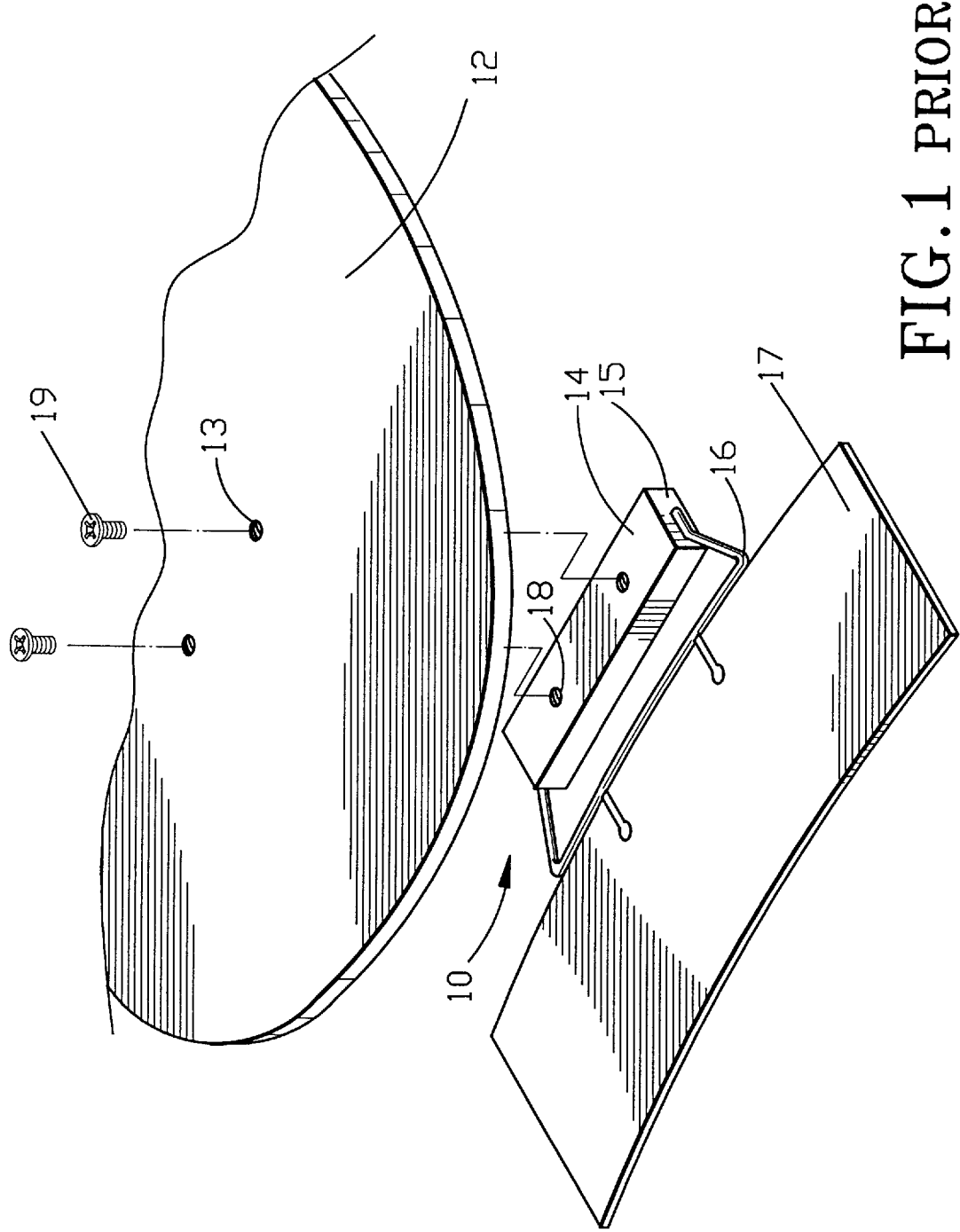
FIG. 1 is a partly exploded view of a conventional eye shading device that is adapted for mounting on a visor of a cap.
Figure 2:
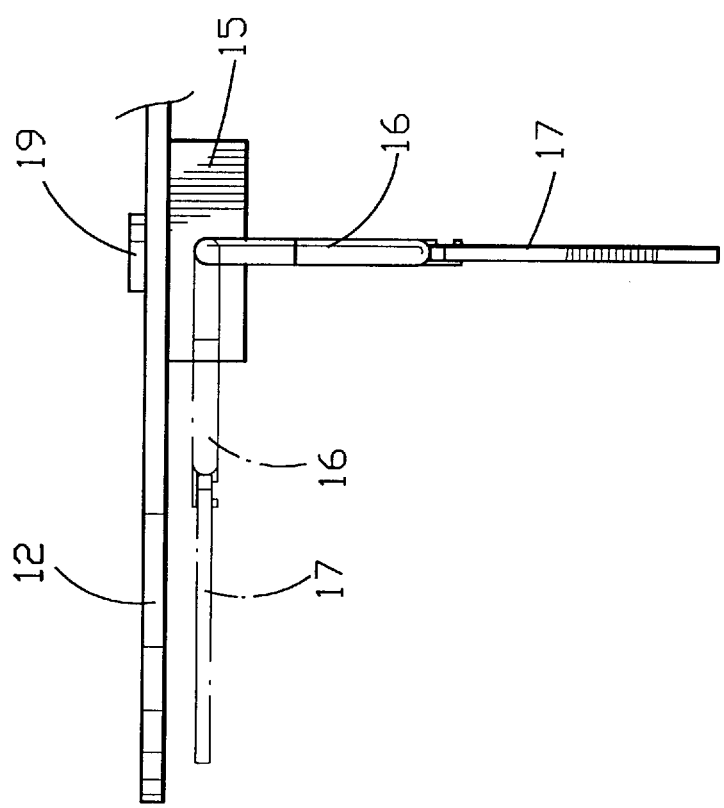
FIG. 2 is a schematic view to illustrate the eye shading device of FIG. 1 in a position of use.

Before the present invention is described in greater detail, it should be noted that like elements are denoted by the same reference numerals throughout the disclosure.

Figure 3:
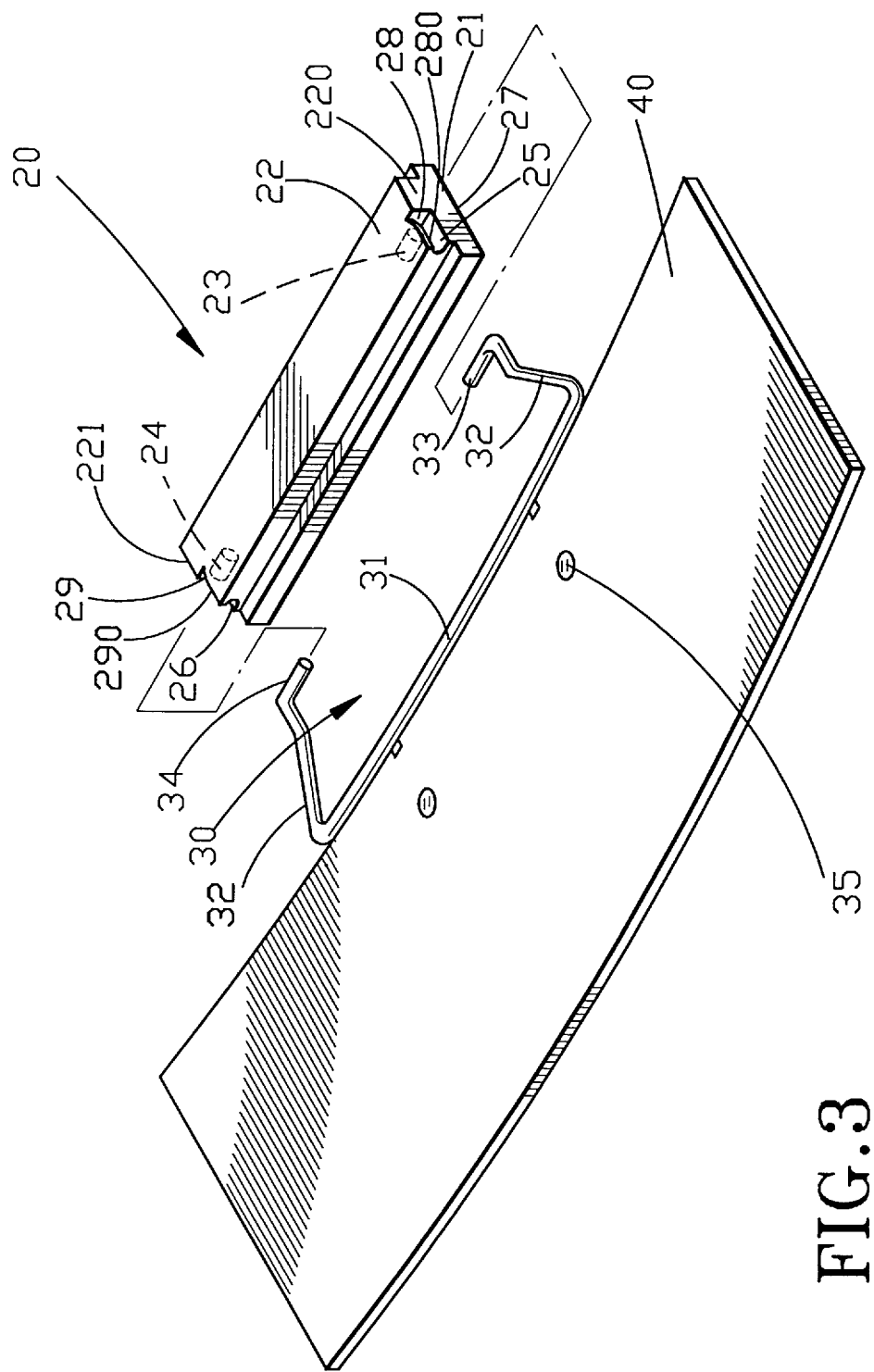
FIG. 3 is an inverted partly exploded view of a first preferred embodiment of an eye shading device of this invention.
Figure 4:
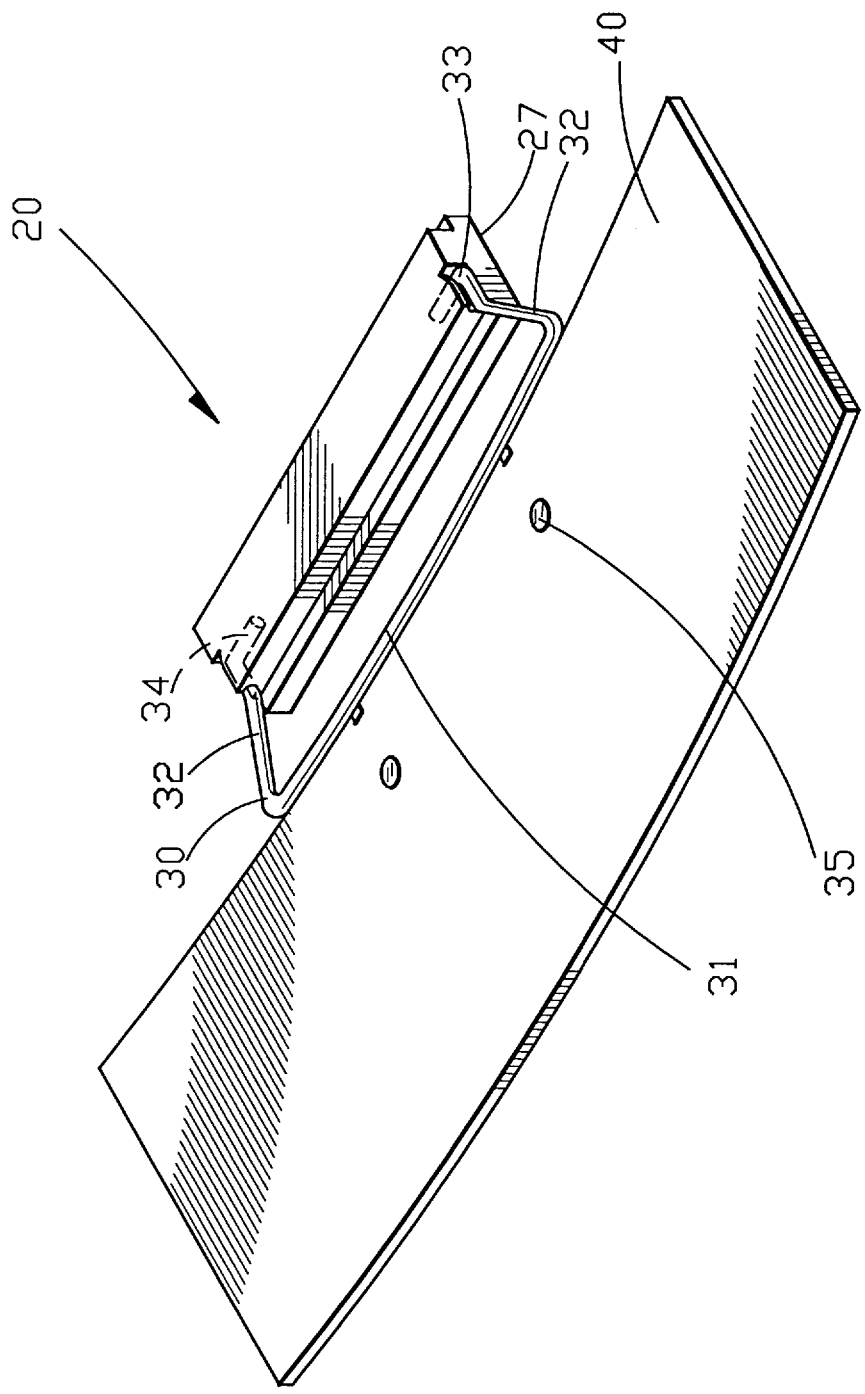
FIG. 4 is an inverted perspective view of the first preferred embodiment.

Referring to FIGS. 3 and 4, the first preferred embodiment of an eye shading device according to the present invention is shown to comprise a rectangular mounting block 20, a lens member 40 and a pivot frame 30 for mounting pivotally the lens member 40 on the mounting block 20.

The mounting block 20 includes an elongated mounting plate 21 and a support plate 22 which extends longitudinally from a bottom side of the mounting plate 21. The support plate 22 has opposite sides 220, 221 which are formed respectively with a blind pivot hole 23, 24, a vertical retaining groove 28, 29 that extends from an insert end of the corresponding pivot hole 23, 24, a horizontal retaining groove 25, 26 that extends from the insert end of the corresponding pivot hole 23, 24, and a protuberance 280, 290 that is defined by the vertical and horizontal retaining grooves 28, 29, 25, 26 on the corresponding side 220, 221 of the support plate 22. The mounting plate 21 further has a top side provided with a planar fastening member 27. In this embodiment, the fastening member 27 is a VELCRO hook-and-loop fastener.

The pivot frame 30 is a generally U-shaped frame which includes a pair of resilient arm portions 32 and an intermediate retaining portion 31 that interconnects the arm portions 32. The arm portions 32 have inwardly bent distal sections 33, 34 that extend pivotally and respectively into the pivot holes 23, 24 in the opposite sides 220, 221 of the support plate 22. The retaining portion 31 is formed with a pair of connectors 35.

The lens member 40 is a generally curved transparent piece that is secured to the retaining portion 31 of the pivot frame 30 at the connectors 35.

Figure 5:
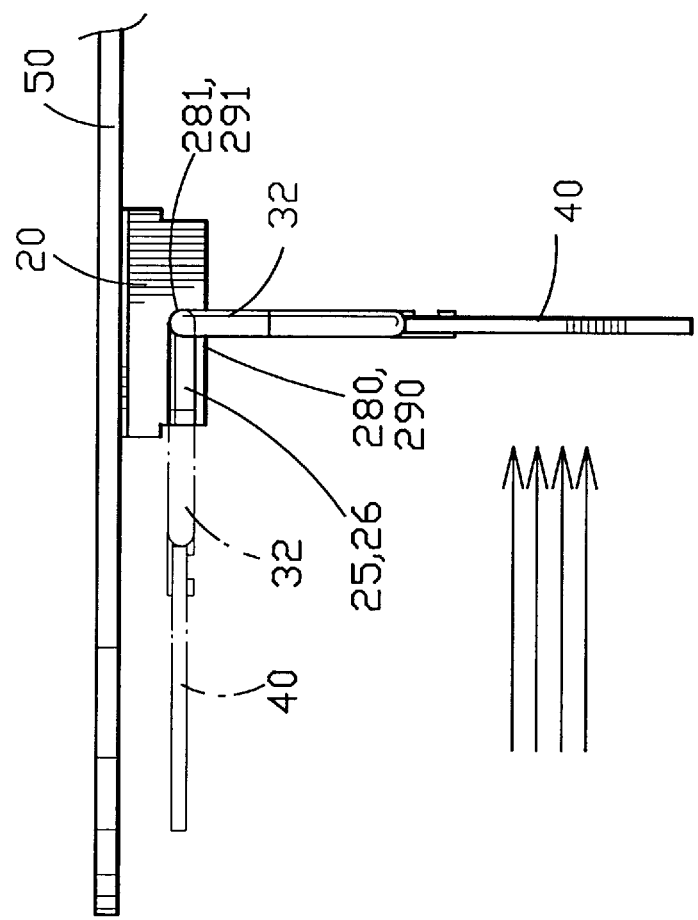
FIG. 5 is a schematic view which illustrates the first preferred embodiment when mounted on a visor of a cap.

Referring to FIG. 5, in use, the fastening member 27 on the top side of the mounting plate 21 secures the eye shading device on a bottom side of a visor 50 of a cap. To protect the eyes of the wearer of the cap against the glare of sunlight, the lens member 40 can be pivoted downwardly relative to the mounting block 20 from an initial position, where the arm portions 32 of the pivot frame 30 are received respectively in the horizontal retaining grooves 25, 26 such that the lens member 40 is held in a substantially horizontal position and is substantially parallel to the visor 50 above the line of sight of the wearer of the cap, as indicated by the phantom lines, to a position of use, where the arm portions 32 of the pivot frame 30 move resiliently past the protuberances 280, 290 so as to be received respectively in the vertical retaining grooves 28, 29 and hold the lens member 40 in a generally vertical position. At this time, the lens member 40 extends downwardly from the visor 50 so as to be directly in front of the eyes of the wearer of the cap and provide protection against the glare of sunlight. In the position of use, the arm portions 32 abut against confining walls 281, 291 of the vertical retaining grooves 28, 29 so that the lens member 40 does not pivot relative to the mounting block 20 when blown by a gust of wind.

Referring to FIG. 6, the second preferred embodiment of an eye shading device according to this invention is shown to be installed on a bottom side 53 of a roof 52 of a vehicle in front of a driver seat of the latter. The second preferred embodiment is generally similar to the first preferred embodiment, the main difference residing primarily in the former having a larger size. As shown in FIG. 6, the fastening member 27 on the top side of the mounting block 20 secures the eye shading device on the bottom side 53 of the roof 52 of the vehicle. To protect the eyes of the driver against the glare of sunlight, the lens member 40 can be pivoted downwardly relative to the mounting block 20 toward a windshield (b) of the vehicle from an initial position, where the lens member 40 is in a substantially horizontal position parallel to the roof 53 of the vehicle and above the line of sight of the driver, as indicated by the phantom lines, to a position of use, where the lens member 40 is in a generally vertical position and extends downwardly from the roof 53 so as to be directly in front of the eyes of the driver of the vehicle and provide protection against the glare of sunlight.

It should be noted that the fastening member 27 should not be limited to the VELCRO hook-and-loop fastener mentioned beforehand. A double-sided adhesive tape may also be used to achieve the same purpose.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An eye shading device comprising:

a mounting block having opposite sides which are formed respectively with a pivot hole that has an insert end, vertical and horizontal retaining grooves that extend from the insert end of said pivot hole, and a protuberance that is defined by said vertical and horizontal retaining grooves, said mounting block further having a top side provided with a planar fastening member;

a generally U-shaped pivot frame which includes a pair of resilient arm portions and an intermediate retaining portion that interconnects said arm portions, said arm portions having bent distal sections that extend pivotally and respectively into said pivot holes in said opposite sides of said mounting block; and a lens member secured to said retaining portion of said pivot frame and pivotable downwardly relative to said mounting block from an initial position, where said arm portions of said pivot frame are received respectively in said horizontal retaining grooves such that said lens member is held in a substantially horizontal position, to a position of use, where said arm portions of said pivot frame move resiliently past said protuberances so as to be received respectively in said vertical retaining grooves and hold said lens member in a generally vertical position.

2. The eye shading device of claim 1, wherein said fastening member comprises a hook-and-loop fasterner.

3. The eye shading device of claim 1, wherein said fastening member comprises a double-sided adhesive tape.

4. The eye shading device of claim 1, wherein said fastening member is adapted to secure said mounting block on a bottom side of a visor of a cap, said lens member being substantially parallel to the visor above a line of sight of a wearer of the cap when in the initial position, and extending downwardly from the visor so as to be directly in front of the eyes of the wearer of the cap and provide protection against sunlight when in the position of use.

5. The eye shading device of claim, wherein said fastening member is adapted to secure said mounting block on a bottom side of a roof of a vehicle in front of a driver seat of the vehicle, said lens member being substantially parallel to the roof of the vehicle above a line of sight of a driver of the vehicle when in the initial position, and extending downwardly from the roof of the vehicle so as to be directly in front of the eye of the driver of the vehicle and provide protection against sunlight when in the position of use.

* * * * *